(12) United States Patent
Kelnhofer et al.

(10) Patent No.: US 8,480,028 B2
(45) Date of Patent: Jul. 9, 2013

(54) OPTIMIZED DEFROSTING REGULATION OF PARALLEL ARRANGED FRESH AIR OUTLETS OF AIR CONDITIONERS

(75) Inventors: Juergen Kelnhofer, Jork (DE); Dariusz Krakowski, Buxtehude (DE); Jose-Javier Francisco-Palomares, Valencia (ES)

(73) Assignee: Airbus Deutschland GmbH, Hamburg (DE)

( * ) Notice: Subject to any disclaimer, the term of this patent is extended or adjusted under 35 U.S.C. 154(b) by 6 days.

(21) Appl. No.: 13/460,505

(22) Filed: Apr. 30, 2012

(65) Prior Publication Data
US 2012/0273051 A1 Nov. 1, 2012

Related U.S. Application Data

(63) Continuation of application No. 12/421,086, filed on Apr. 9, 2009, now abandoned, which is a continuation of application No. PCT/EP2007/008898, filed on Oct. 12, 2007.

(60) Provisional application No. 60/829,348, filed on Oct. 13, 2006.

(30) Foreign Application Priority Data

Oct. 13, 2006 (DE) .......................... 10 2006 048 622

(51) Int. Cl.
*B64D 11/00* (2006.01)
(52) U.S. Cl.
USPC ...................................................... 244/118.5
(58) Field of Classification Search
USPC .................. 244/53 B, 58, 118.5; 62/401, 402
See application file for complete search history.

(56) References Cited

U.S. PATENT DOCUMENTS

| | | | | |
|---|---|---|---|---|
| 4,482,114 A | * | 11/1984 | Gupta et al. | 244/134 B |
| 4,684,081 A | * | 8/1987 | Cronin | 244/58 |

(Continued)

FOREIGN PATENT DOCUMENTS

| | | |
|---|---|---|
| DE | 10201427 A1 | 7/2003 |
| DE | 10247335 B3 | 4/2004 |

(Continued)

OTHER PUBLICATIONS

German Patent Office, German Office Action for Application No. 10 2006 048 622.6-22 mailed Sep. 27, 2010.

(Continued)

*Primary Examiner* — Tien Dinh
*Assistant Examiner* — Keith L Dixon
(74) *Attorney, Agent, or Firm* — Ingrassia Fisher & Lorenz P.C.

(57) ABSTRACT

An arrangement is provided for de-icing pipeline connections of an aircraft, which are connected to all fresh air outlets of an air conditioner, whose construction includes, but is not limited to the functions of multiple turbines and heat exchangers, having a first pipeline, which is connected to a first turbine, and a second pipeline, which is connected to a second turbine, the two pipelines, which are each connected downstream from the two turbines and to which process air is fed at the turbine outlets, being connected at the pipe ends and being continued using a third pipeline. The arrangement is characterized in that a first hot air source is fed hot fresh air from a bleed air system of the aircraft and is connected at its outlet to a fourth pipeline, into which temperature-reduced fresh air is fed from the hot air source. The fourth pipeline is connected at its pipe end to two further valve-regulated pipelines, of which a fifth or a sixth pipeline is connected to the first or the second pipeline, and through which temperature-reduced fresh air is transported and fed valve-regulated to the first and/or second pipeline.

11 Claims, 2 Drawing Sheets

U.S. PATENT DOCUMENTS

| | | | |
|---|---|---|---|
| 5,967,461 A * | 10/1999 | Farrington | 244/118.5 |
| 7,618,008 B2 * | 11/2009 | Scherer et al. | 244/117 R |
| 2003/0177781 A1 | 9/2003 | Haas et al. | |
| 2004/0051002 A1 * | 3/2004 | Sampson | 244/118.5 |
| 2004/0194493 A1 | 10/2004 | Army, Jr. et al. | |
| 2005/0011217 A1 | 1/2005 | Brutsher et al. | |
| 2005/0115249 A1 | 6/2005 | Haas et al. | |
| 2007/0284480 A1 * | 12/2007 | Atkey et al. | 244/135 R |
| 2008/0090510 A1 | 4/2008 | Scherer et al. | |
| 2008/0217476 A1 * | 9/2008 | Barbara et al. | 244/118.5 |

FOREIGN PATENT DOCUMENTS

| | | | |
|---|---|---|---|
| DE | 10301465 A1 | 8/2004 | |
| EP | 0888966 A2 | 1/1999 | |
| EP | 1555205 A2 | 7/2005 | |
| GB | 880616 A | 10/1961 | |
| RU | 2281435 C1 | 8/2006 | |
| WO | 9737890 | 10/1997 | |

OTHER PUBLICATIONS

Russian Patent Office, Russian Notice of Allowance dated Jul. 21, 2011 for Russian Application No. 2009117473/11(023988).

U.S. Patent and Trademark Office, U.S. Office Action dated Sep. 1, 2011 for U.S. Appl. No. 12/421,086.

U.S. Patent and Trademark Office, U.S. Notice of Allowance mailed Feb. 1, 2012 for U.S. Appl. No. 12/421,086.

* cited by examiner

OPTIMIZED DEFROSTING REGULATION OF PARALLEL ARRANGED FRESH AIR OUTLETS OF AIR CONDITIONERS

CROSS-REFERENCE TO RELATED APPLICATION

This application is a continuation of U.S. application Ser. No. 12/421,086, filed Apr. 9, 2009, which claims priority to International Application No. PCT/EP2007/008898, filed Oct. 12, 2007, which was published under PCT Article 21(2), and this application claims priority to German Patent Application No. 102006048622.6 filed Oct. 13, 2006 and this application also claims priority to U.S. Provisional Patent Application No. 60/829,348 filed Oct. 13, 2006, the disclosure of which applications are hereby incorporated herein by reference.

TECHNICAL FIELD

The present invention relates to an arrangement of pipeline connections of an aircraft and to a method for regulating a process air temperature of pipeline connections of an aircraft.

BACKGROUND

In current passenger aircraft, cold ambient air on one hand and hot exhaust air from a so-called bleed air system of an aircraft engine on the other hand are used for air conditioning of the cabin. Ambient air is fed into an aircraft cabin for the fresh air supply of the passengers and for temperature control of the aircraft cabin. The cool fresh air is mixed with the hot bleed air in a mixing chamber, thus temperature-controlled, and distributed in the aircraft cabin.

To meet corresponding cooling requirements, ambient air or air-conditioned air having a temperature approximately below the 0° C. boundary is frequently used in aircraft air conditioners. Because of this cold temperature below the freezing point and the simultaneous presence of free water and/or ambient humidity, icing of the downstream pipelines and the installed devices or valve may occur, if they come into contact with the cold air, which contains water. This may interfere with the function of check valves, cause damage to valves, and cause the breakdown of corresponding devices or possibly damage to pipelines, for example. It has been shown that the icing is especially critical in a temperature range from approximately −8° C. to 0° C., because crystals may frequently form due to the relatively high proportion of free water.

Various regulating algorithms are known, which are to prevent icing and/or are to remove existing icing (anti-ice control). Thus, for example, the possibility exists of heating the temperature of the air-conditioning outlet air cyclically (i.e., temporarily, significantly above the 0° C. limit within a predefined period of time to thus remove possibly existing ice or ice particles in the air conditioner outlet pipeline and/or the devices installed therein, such as sensors, check valves, etc.).

In a broad regulating algorithm, the temperature of the air conditioner outlet air is kept continuously above the 0° C. limit. Icing may be prevented in this way, so that no ice or ice particles may form in the air conditioner outlet pipeline and/ or devices installed therein. When a temperature over 0° C. is maintained, reduced cooling capacity occurs. The dependence of the temperature difference (dT) is clear on the basis of the formula $Q = m \times dT \times cp$. This has a linear effect on a total cooling capacity (Q) of the air conditioner.

The total cooling capacity of the air conditioner is significantly reduced by the cyclic heating of the air-conditioning outlet temperature or permanently maintaining the temperature at significantly above 0° C. Sufficient cooling capacity may thus no longer be applied upon mixing with the hot bleed air in the mixing chamber, so that the cabin temperature of the aircraft cabin increases, which reduces the cabin comfort.

In a further regulating algorithm, the critical range from approximately −8° C. to 0° C. may be left out and/or passed rapidly by special regulation of the air conditioner outlet temperature. The air conditioners deliver hot air above approximately 0° C. and cold air below approximately −8° C. cyclically, which is mixed later in a mixing chamber. By leaving out the critical temperature range, nearly no ice or ice particles form in the air conditioner outlet pipe and/or the devices installed therein. These air conditioners which do not drive and/or pass rapidly through the critical area from approximately −8° C. to 0° C. have a smaller risk of ice formation and/or ice particle formation in the air conditioner outlet pipelines and/or the devices installed therein.

However, temperature oscillations arise in the cabin due to this rapid passage through the critical temperature range and the cyclically varying air supply at different temperatures, so that a continuous temperature change is detectable in the cabin. This results in reduced cabin comfort. Because of the regulation to a low air conditioner outlet temperature, the air conditioner delivers higher cooling capacity than is needed in the aircraft cabin for cooling. Because of the cold air conditioner outlet temperature of the air conditioner, it must be heated in a complex and costly way, for example, via powerplant air, auxiliary powerplant air, or so-called ground carts. The overall efficiency of the air conditioner is thus reduced.

Among other things, it at least one object of the present invention to reduce the icing danger in air conditioners for aircraft. In addition, other objects, desirable features, and characteristics will become apparent from the subsequent summary and detailed description, and the appended claims, taken in conjunction with the accompanying drawings and the foregoing technical field and background.

SUMMARY

The at least one object is achieved by an arrangement for deicing pipeline connections of an aircraft and by a method for regulating a process air temperature of process air transported using pipeline connections of an aircraft having the features as subsequently described and claimed.

According to an exemplary embodiment of the present invention, an arrangement for deicing pipeline connections of an aircraft is provided. The arrangement comprises all fresh air outlets of an air conditioner, a turbine or a heat exchanger. The construction of the air conditioner may also comprise the functions of multiple turbines and heat exchangers. The arrangement comprises a first pipeline, which is connected to a first turbine, and a second pipeline, which is connected to a second turbine. The two pipelines, which are each connected downstream from the two turbines and to which process air is fed on the turbine outlet side, are connected at the pipe ends and continued using a third pipeline. The arrangement is characterized in that (hot) fresh air from a bleed air system of the aircraft is fed to a first hot air source, to which a fourth pipeline is connected at its outlet, to which temperature-reduced fresh air from the hot air source is fed. The fourth pipeline comprises two further valve-regulated pipelines connected at its pipe ends, from which a fifth or a sixth pipeline is connected to the first or the second pipeline, through which the temperature-reduced fresh air is transported and fed valve-regulated to the first and/or second pipeline.

According to a further exemplary embodiment, a method is specified for regulating a process air temperature of process air transported using pipeline connections of an aircraft, in which method a connection of the pipeline connections guiding the process air to all fresh air outlets of an air conditioner a turbine or a heat exchanger. The construction of the air conditioner may also comprises the functions of multiple turbines and heat exchangers, according to which the process air is provided at the output side to a first and a second turbine and then fed under pressure to respectively a first and a second pipeline connected downstream from each turbine. The method is characterized in that in a step a), firstly a first hot air source is supplied hot fresh air from the bleed air system of the aircraft, at the outlet, pressurized reduced-temperature fresh air is provided, which is fed to a fourth pipeline connected at the outlet of the first hot air source and transported through the pipeline. In a step B, the reduced-temperature fresh air is conducted into a fifth pipeline attached at the pipe end of the fourth pipeline and into a sixth pipeline. The transport of the reduced-temperature fresh air is then continued in a step C using a fresh air component of reduced-temperature fresh air branched off from each of the fifth and the sixth pipelines through these two pipelines. In a step D, the process air leaves the fifth and the sixth pipelines valve-regulated and is alternately fed into the first or the second pipeline. In a step E, the air transport continues through a remaining pipeline section, which follows the feed point according to step D and remains in the first and second pipeline, using which mixed process air is produced. In a step S, the mixed process air is fed after a first and a second pipeline into a third pipeline continued at the pipe ends and fed to downstream units of the aircraft connected to the third pipeline.

Using the arrangement and the method according to embodiments of the present invention, an icing risk of components of an air-conditioning system may be reduced without causing temperature oscillations at the air conditioner outlet. Using separate mixing of the exhaust air of a first turbine and a second turbine with hot fresh air and/or the bleed air of a bleed air system of the aircraft, two air flows having different temperature controls are provided. Subsequent controlled mixing of the air flows having different temperature controls in the third pipeline provides a constant temperature. The temperature in the third pipeline is permanently kept above approximately 0° C., so that icing of downstream components is avoided.

In the embodiments of the present invention, a hot air source provides temperature-reduced fresh air. The fifth pipeline is connected to a first turbine and the sixth pipeline is connected to a second turbine. The temperature-reduced fresh air of the hot air source may thus be mixed with specific air components of the exhaust air of the first turbine or the exhaust air of the second turbine. The mixed air is conveyed further using the first pipeline or the second pipeline. Temperature mixing of the first turbine and the fifth pipeline occurs in the first pipeline, air mixing of the second turbine and the sixth pipeline occurs in the second pipeline. The air mixtures in the first pipeline and the second pipeline have different temperatures. The mixed air from the first pipeline and the mixed air from the second pipeline may each be discharged to a third pipeline. By mixing the mixed air of the first pipeline and the mixed air of the second pipeline, the air in the third pipeline may permanently be kept at a constant temperature. If the temperature in the third pipeline is permanently kept above approximately 0° C., icing of downstream components may be avoided. Because of the constant air temperature in the third pipeline, in the case in which the third pipeline provides air for cabin temperature control, the air temperature may continuously be kept constant, so that temperature oscillations in a cabin area of the aircraft may be kept small.

It is ensured by the procedure that the air conditioner outlet pipeline and/or the third pipeline and the installed units following the air flow such as an air conditioner check valve remain free of ice and/or ice particles. In the second pipeline and the first pipeline, the air may have a temperature from below approximately −8° C. or above approximately 0° C., so that the critical range of approximately −8° C. to approximately 0° C., approximately −12° C. to approximately 0° C., approximately −16° C. to approximately 0° C., or approximately −20° C. to approximately 0° C. is left out. Because of the controlled mixing of the air from the first pipeline and the second pipeline, the temperature in the third pipeline and/or the cabin temperature in aircraft may be kept constant.

According to a further exemplary embodiment, the hot air source comprises a heat exchanger. Hot fresh air from a bleed air system of the aircraft may be provided to the heat exchanger. The heat exchanger is adapted to provide the temperature-reduced fresh air to the fourth pipeline. The hot exhaust air of the bleed air system is regulated in the heat exchanger to form temperature-reduced fresh air and distributed to the fifth pipeline and the sixth pipeline. Therefore, a defined output temperature of the temperature-reduced fresh air may be set.

According to a further exemplary embodiment, the hot air source comprises an air conditioner. The air conditioner is adapted to provide the temperature-reduced fresh air. Thus, for example, the heating power or the waste heat of the air conditioner may be exploited to provide the temperature-reduced fresh air.

According to a further exemplary embodiment, the hot air source comprises an external heat source. The external heat source is adapted to provide the temperature-reduced fresh air. The external heat source may comprise an electrical or pneumatic heater, for example.

According to a further exemplary embodiment, the first pipeline and the second pipeline comprise electrical heating elements. The electrical heating elements may comprise electrical heating mats which are wound around the pipelines, for example.

According to a further exemplary embodiment, the two pipelines are connected at the pipe ends to a first pipeline branch and the latter is continued by the third pipeline. The pipeline branch may be used for mixing the mixed air from the first pipeline and the second pipeline. Therefore, using the pipeline branch, an air mass flow from the first pipeline and/or the second pipeline may be regulated and thus a defined temperature may be set in the third pipeline.

According to a further exemplary embodiment of the present invention, the fourth pipeline is connected at the pipe end to a second pipeline branch and the pipeline branch is connected to the fifth and sixth pipelines. The hot air mass flow from the heat exchanger may thus be distributed using the second pipeline branch to the fifth pipeline and the sixth pipeline. Using the second pipeline branch, the exhaust air of the heat exchanger may be distributed in a predetermined air mass flow ratio to the fifth and sixth pipelines, so that, for the later mixing with the exhaust air of the first turbine or the second turbine, an air mass flow of the exhaust air of the heat exchanger required for this purpose may be provided. For example, if an air mass flow of the first or second turbine which is too cold is provided, more hot air may be provided for mixing in the fifth or sixth pipeline.

According to a further exemplary embodiment, the fifth pipeline is connected to a third pipeline branch, the third pipeline branch being connected between the fifth and the first pipeline. The sixth pipeline is connected to a fourth pipeline branch, the fourth pipeline branch being connected between the second and sixth pipelines.

According to a further exemplary embodiment, an air flow regulating valve, which is adapted to regulate the air mass flow of the temperature-reduced fresh air, is integrated respectively in the fifth pipeline and the sixth pipeline.

According to a further exemplary embodiment, the first or the second air flow regulating valve is equipped with a time delay element, so that both air flow regulating valves may provide a time-delayed regulation of the flow rate of temperature-reduced fresh air.

According to a further exemplary embodiment, a check valve is integrated in the third pipeline.

The embodiments of the arrangement also apply for the method and vice versa.

According to a further exemplary embodiment of the method, the mixed process air according to step E is composed of the process air provided at the turbine outlet and the branched-off fresh air component of temperature-reduced fresh air.

According to a further exemplary embodiment of the method, the process air is temperature-controlled in a variable way by the alternate feeding of the valve-regulated fresh air components of temperature-reduced fresh air according to step d).

According to a further exemplary embodiment of the method, the transport of the particular fresh air component which is fed to the fifth and the sixth pipelines is controlled using the particular air flow regulating valve, that are integrated in the fifth and/or the sixth pipelines.

According to a further exemplary embodiment of the method, the transport of the particular fresh air component through the fifth or sixth pipeline occurs with a time delay and is implemented using a time-delay element integrated in the relevant air flow regulating valve.

According to a further exemplary embodiment of the method, a second fresh air component which flows through the sixth pipeline 6 is transported with a time delay in comparison to a first fresh air component which flows through the fifth pipeline and is viewed as a reference fresh air component, or vice versa.

According to a further exemplary embodiment of the method, in a step f), the first and the second turbines first provide process air at the turbine outlet whose process air temperature operates within a first time range A-B in the part-load range from approximately 0° C. to approximately −8° C., and in the same way during an operating time of the air conditioner operation, temperature-reduced fresh air is provided at the outlet of the first heat exchanger according to step a), whose fresh air temperature operates in the load range from approximately 30° C. to approximately 100° C.

Furthermore, in a step g), the process air temperature of the first turbine is then increased by the valve-regulated supply of a fresh air component of temperature-reduced fresh air according to step d) to at least approximately 30° C. to approximately 45° C., by which all process air lines connected downstream from the turbines and valves integrated therein are de-iced. Simultaneously, the process air temperature of the second turbine is moved to maximum cooling capacity, by which further ice accumulations in or on the process air lines are prevented, these process air temperatures of the two turbines being kept at a constant temperature value within a second time range B-C.

In a step h), the process air temperature of the first turbine and the second turbine is then brought by the valve-regulated feed of a fresh air component of temperature-reduced fresh air according to step d) to a normal process air temperature, the normal process air temperature corresponding to that according to step f). This process air temperature of the first turbine and the second turbine is kept at a constant temperature value within a third time range C-D.

The process air temperature of the first turbine is then moved to maximum cooling capacity in a step i). The process air temperature of the second turbine is simultaneously increased to approximately 30° C. to approximately 45° C. by the valve-regulated feed of a fresh air component of temperature-reduced fresh air according to step d). Ice accumulations in or on the second pipeline connected downstream from the second turbine are thus prevented. Furthermore, the pipelines connected to the pipeline and the valves integrated in the pipeline are prevented from icing. These process air temperatures of the two turbines, the first turbine and the second turbine, are kept at a constant temperature value within a fourth time range D-E.

In a step j), the measures of step h) are repeated, with the restriction that the process air temperature of the two turbines is kept at a constant temperature value step-by-step within a fifth time range E-A.

The temperature in the first time range in step f) may also have a temperature range from approximately 0° C. to approximately −8° C., approximately 0° C. to approximately −10° C., approximately 0° C. to approximately −12° C., and approximately 0° C. to approximately −20° C., for example.

The process air temperature in step g) may also have a temperature which is generated using the maximum cooling capacity of the second turbine. Moreover, the process air temperature may have a temperature which is generated using a part-load range of the second turbine.

The process air temperature in step i) may also have a temperature which is generated using the maximum cooling capacity of the first turbine. Furthermore, the process air temperature may have a temperature which is generated using a part-load range of the first turbine.

Steps f) through j) may be selected arbitrarily, and/or executed in arbitrary sequence.

According to a further exemplary embodiment of the method, according to step g), valve-regulated throttling of the particular fresh air component of temperature-reduced fresh air is performed using a second air flow regulating valve which is integrated in the sixth pipeline and operates with a time delay. The process air temperature of the second turbine is thus reduced using a predefined time delay, until the maximum cooling capacity is reached, if the process air temperature of the process air of the first turbine is increased using a fresh air component of temperature-reduced fresh air which passes the fifth pipeline, which is valve-regulated by a first air flow regulating valve integrated in the fifth pipeline.

The process air temperature may also have a temperature which is generated using the maximum cooling capacity of the second turbine. Furthermore, the process air temperature may have a temperature which is generated using a part-load range of the second turbine.

According to a further exemplary embodiment, according to step i), a valve-regulated throttling of the particular fresh air component of temperature-reduced fresh air is performed using the first air flow regulating valve, which is integrated in the fifth pipeline and operates with a time delay. The process air temperature of the first turbine is reduced using a predefined time delay until the maximum cooling capacity is reached, if the process air temperature of the process air of the second turbine is increased using the fresh air component of temperature-reduced fresh air passing the sixth pipeline which is valve-regulated by the second air flow regulating valve integrated in the sixth pipeline.

The process air temperature may also have a temperature which is generated using the maximum cooling capacity of the first turbine. Furthermore, the process air temperature may have a temperature which is generated using a part-load range of the first turbine.

According to a further exemplary embodiment of the method, steps f) through j) are primarily performed during the time the aircraft is located on the ground and repeated arbitrarily in the specified sequence.

According to a further exemplary embodiment of the method, performing steps f) through j) is related to a time which relates to the interval of the takeoff and landing phases of the aircraft or during the flight at very low altitudes below approximately 15,000 feet. According to embodiments of the present invention, the disadvantages of achievements of the object known from the prior art may be reduced. For example, if the temperature in the elements at the outlet of the air conditioners is cyclically heated above approximately 0° C. within a predefined interval, to thus remove existing ice or ice particles, the overall cooling capacity of the air conditioner may be reduced. In this way, cooling capacity may no longer be sufficient in the aircraft cabin to keep the cabin temperature constant.

However, air conditioners which have a permanent air outlet temperature above approximately 0°, in contrast, have a reduced cooling capacity. The dependence of the temperature dT is clear on the basis of the formula $Q=m \times dT \times cp$, because this has a linear effect on the overall cooling capacity Q. If air conditioners are used whose regulation may not drive and/or passes rapidly through the critical area of approximately −8° C. to approximately 0° C., there may be a small risk of ice or ice particles accumulating in the air conditioner outlet pipeline and/or the devices installed therein. However, these jumps in the air conditioner outlet temperature may have a nearly direct effect on the cabin temperature, which results in reduced cabin comfort. By regulation to a low air conditioner outlet temperature, the air conditioner delivers higher cooling capacity than is needed in the aircraft cabin for cooling. The complexly and expensively generated cooling capacity must then be compensated for in turn by additional heating. The overall efficiency of the air conditioner is significantly may be reduced in this case.

A further aspect of the present invention may be seen in that an air conditioning system is provided, which comprises a first cold air source having a first cold air flow, a second cold air source having a second cold air flow, and a hot air source having a hot air flow. Furthermore, the air conditioning system comprises a first mixing chamber, a second mixing chamber, and a third mixing chamber. The first mixing chamber for generating first mixed air is set up in such a way that the first cold air flow and the hot air flow may be provided thereto. The second mixing chamber is set up in such a way that the second cold air flow and the hot air flow may be provided thereto. The first mixed air and the second mixed air may be fed to the third mixing chamber to generate third mixed air.

In a further aspect of the present invention, a method for regulating third mixed air is provided. The hot air source is provided with hot air of a bleed air system of an aircraft. The hot air is fed to a first mixing chamber and mixed with first mixed air so that first mixed air results. Furthermore, the hot air is fed to a second mixing chamber and mixed with second mixed air so that second mixed air results. The first mixed air and the second mixed air are fed to a third mixing chamber to generate third mixed air. The third mixed air may be fed to apparatuses of the aircraft.

The embodiments of the air conditioning system also apply for the method for regulating third mixed air and vice versa.

The mixing chambers may comprise controllable regulating valves, which control the air mass flows of the incoming air flows in accordance with a temperature of the mixed airs to be mixed.

The first and second cold air sources may comprise, for example, bypass flows of turbines or air inlets of an aircraft. The hot air source comprises a turbine and/or a bleed air system of an aircraft, for example.

Bleed air is understood as tapped air which is taken from the bypass flow (secondary, cold) and/or the core flow (primary, hot) of an aircraft powerplant. The tapped air is used to regulate and control the engine or entire aircraft systems, such as air conditioners. Above all, the gas turbine of a turbo fan or an APU comes into consideration for using the tapped air, for example. The international term typically used in aviation for this purpose is bleed air, or BA for short.

Therefore, a cabin temperature may be kept constant and nonetheless the risk of icing may be reduced by the exemplary embodiment. Two first and second mixed air flows which are temperature-controlled differently, and which are provided by mixing the first cold air flow or the second cold air flow and the hot air flow, either have a temperature colder than approximately −8° C. or hotter than approximately 0° C., so that a risk of icing is reduced. Nonetheless, a constant air temperature of the third mixed air may be provided because of controlled mixing of the first and second mixed air flows, so that a cabin temperature may be kept constant.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background and summary or the following detailed description. The illustrations in the figures are schematic and are not to scale.

Figure 1:
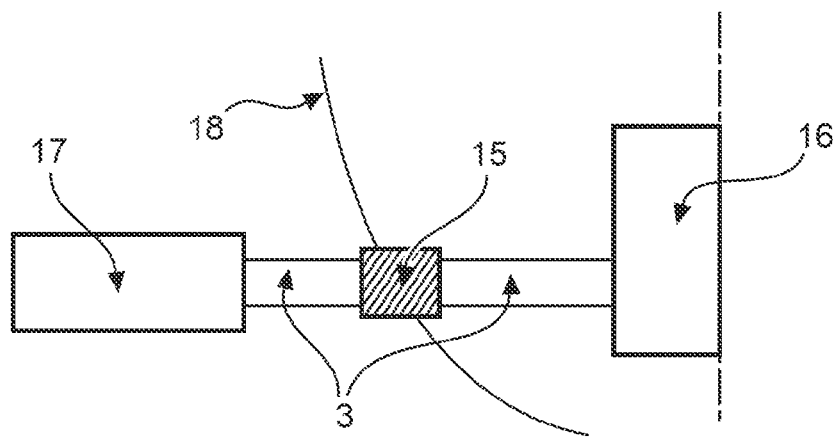
FIG. 1 shows a schematic illustration of an air-conditioning unit known from the prior art.

FIG. 1 shows a known arrangement for supplying fresh air to the passengers and for cooling and/or heating an aircraft cabin 18. Using a mixing chamber 16, cool fresh air is distributed in the aircraft cabin 18. The cool fresh air of the air conditioner 17 is fed through a corresponding pipeline 3 to the mixing chamber 16. In the case of a pipe rupture, which may result in depressurization of the cabin, a check valve 15 may be situated in the pipeline 3. Cool air is blown into the pipeline 3 below the approximately 0° C. boundary, so that the danger exists that components such as the check valve 15 will freeze.

Figure 2:
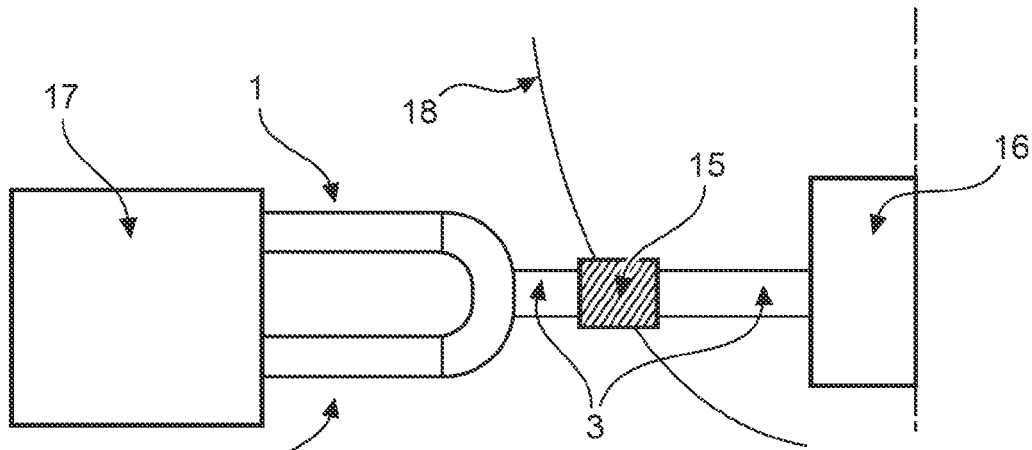
FIG. 2 shows a schematic illustration of an exemplary embodiment of the arrangement according to the present invention having mixing of air flows temperature-controlled in different ways.
Figure 3:
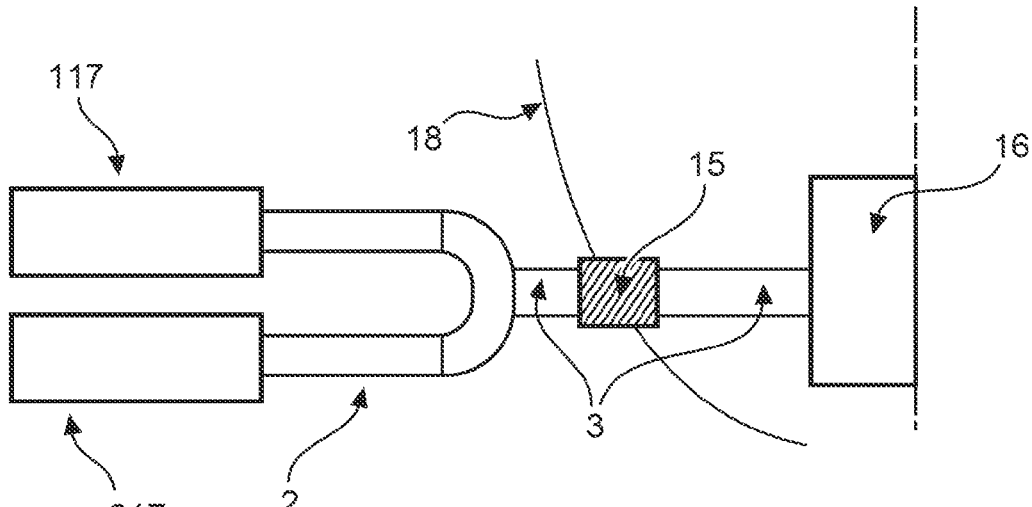
FIG. 3 shows a schematic illustration of an exemplary embodiment of the present invention, in which process airs temperature-controlled in different ways are provided from two air conditioners.

FIG. 2 and FIG. 3 show examples of a basic principle according to the present invention. FIG. 2 shows an air-conditioning system having two air outlets in the pipes 1 and 2. The possibility exists of heating the air conditioner outlet temperature cyclically in pipeline 1 above the approximately 0° C. boundary and cooling it in the pipeline 2 below approximately −8° C., for example, due to the two air outlets in the pipelines 1 and 2. The air flows from the pipelines 1 and 2 are mixed and kept at a temperature above approximately 0° in a third pipeline 3. The mixed air in pipeline 3 is above approximately 0° C., so that the components, such as the check valve 15, do not freeze. A constant temperature may be set via targeted mixing of the air flows 1, 2 in the third pipeline 3.

FIG. 3 shows a similar mode of operation as described in FIG. 2, but for two air conditioners 117 and 217 installed in parallel. Using two air conditioners 117, 217, two different outlet temperatures may be provided independently of one another, without the mixing temperature at the check valve 15 changing.

Figure 4:
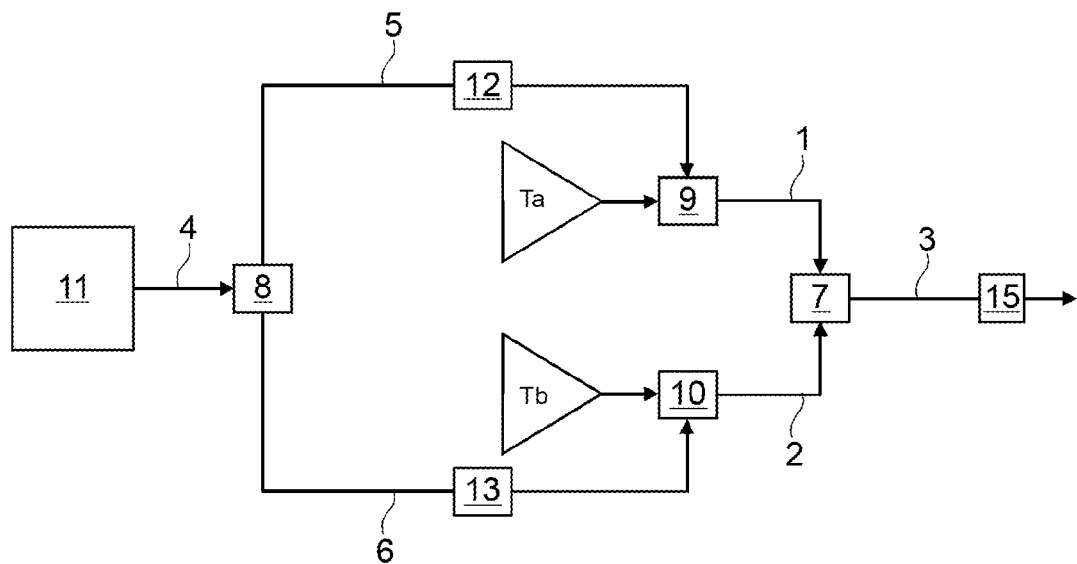
FIG. 4 shows a schematic illustration of an exemplary embodiment of the present invention, in which hot air is provided via a bleed air system of an aircraft.

An exemplary embodiment of the present invention is described in FIG. 4. The arrangement, as shown in FIG. 4, displays a first turbine TA having first process air and a second turbine TB having second process air. Furthermore, the arrangement comprises a heat exchanger 11, which obtains hot fresh air from a bleed air system of a turbine of an aircraft, for example, and discharges the heat to temperature-reduced fresh air. A fourth pipeline 4 conveys the temperature-reduced fresh air to a second pipeline branch 8, which distributes the temperature-reduced fresh air to a fifth and a sixth pipeline 5, 6. The first process air of the first turbine is mixed with the temperature-reduced fresh air of the fifth pipeline 5 at a third pipeline branch 9 and discharged to a first pipeline 1. The temperature-reduced fresh air of the sixth pipeline 6 is mixed at a fourth pipeline branch 10 with the second process air of the second turbine TB and fed to a second pipeline 2. The first mixed air of the first pipeline 1 and the second mixed air of the second pipeline 2 is fed to a first pipeline branch 7 and relayed to a third pipeline 3. The third pipeline 3 conveys third mixed air to an aircraft cabin or other air-conditioning elements, such as a check valve 15. To better control the air flows, a first or second air flow regulating valve 12, 13 may be situated in the fifth pipeline 5 and in the sixth pipeline 6, respectively.

Figure 5:
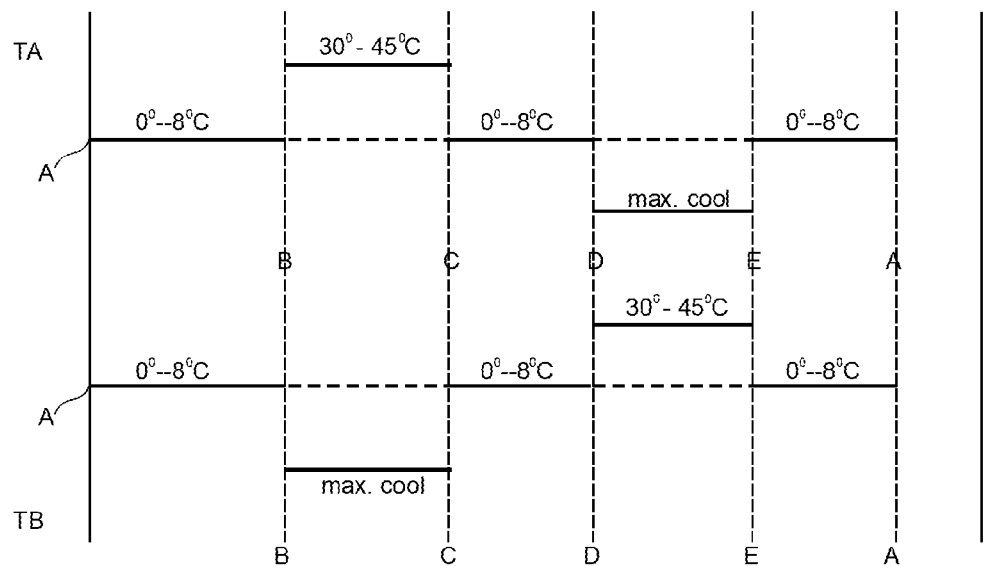
FIG. 5 shows a schematic illustration of exemplary temperature regulation of the mixed air.

The sequence of the method for regulating a process air temperature may be described using FIG. 5. Within a first time range A-B, the first turbine TA provides first process air and the second turbine TB provides second process air, each having a temperature range from approximately 0 to approximately −8° C. At the outlet of the first heat exchanger 11, temperature-reduced fresh air is provided, whose temperature is approximately 30° C. to approximately 100° C., for example. Subsequently, the first process air of the first turbine TA may have its temperature increased to approximately 30° C. to approximately 45° C. by the valve-regulated supply of the temperature-reduced fresh air of the heat exchanger 11, because of which all process air lines downstream from the turbines, such as the first pipeline 1, may not ice. Simultaneously, the second process air temperature of the second turbine TB may be moved to maximum cooling capacity, by which further ice accumulations in or on the process air lines, such as the second pipeline 2, are prevented, because the critical area from approximately 0° C. to approximately −8° C. is not passed through. Therefore, the first process air temperature of the first turbine TA and the second process air temperature of the second turbine TB may be kept at a constant temperature value within a second time range B-C. In a time range C-D, both process air temperatures may again be moved to a range from approximately 0 to approximately −8° C. Subsequently, the process air temperature of the second turbine TB may be brought to a temperature range from approximately 30 to approximately 45° C. and the first process air temperature of the first turbine TA may be brought to maximum cooling capacity of colder than approximately −8° C. Therefore, the second turbine TB may be deiced using the first process air at greater than approximately 0° C. In spite of the change of the temperature ranges, the particular downstream components in the first and second pipelines 1, 2 are deiced cyclically and constant third mixed air may be obtained by mixing the process air temperatures with the temperature-reduced fresh air. Temperature oscillations in the cabin may thus be avoided.

Moreover, it is to be noted that "comprising" does not exclude other elements or steps and "a" or "one" does not exclude multiples. Furthermore, it is to be noted that features or steps which have been described with reference to one of the above exemplary embodiments may also be used in combination with other features or steps of other exemplary embodiments described above.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for regulating a process air temperature of transported process air in pipeline connections of an aircraft, in which the pipeline connections guiding the process air are connected to a fresh air outlet, an air conditioner, a turbine, or a heat exchanger, wherein the process air being provided at the outlet of a first turbine and a second turbine to the pipeline connections and the process air subsequently being fed under pressure respectively to a first pipeline and a second pipeline connected downstream from the first turbine and the second turbine, a first steps comprises the steps of:

a) firstly a hot air source is fed hot fresh air from a bleed air system of an aircraft, temperature-reduced pressurized fresh air is provided at the outlet of a first hot air source, which is fed to a fourth pipeline connected at the outlet of the first hot air source and is transported through the pipeline, b) introducing a temperature-reduced fresh air into a fifth pipeline and a sixth pipeline connected at a pipe end of the fourth pipeline;

c) continuing support through these two pipelines with a fresh air component of the temperature-reduced fresh air branched off respectively from the fifth pipeline and the sixth pipeline;

d) leaving the fifth pipeline and the sixth pipeline valve-regulated by at least one of a first air flow regulating valve and a second air flow regulating valve adapted for regulating an air mass flow of the temperature-reduced fresh air and alternately fed into at least one of the first pipeline or the second pipeline in addition to the process air, and e) occurring an air transport with mixed process air through a remaining pipeline section, which follows a feed point according to step d) and remains in the first pipeline and the second pipeline;

f) feeding into a third pipeline continued at the pipe end of the first pipeline and the second pipeline and supplied to downstream units of the aircraft connected to the third pipeline, wherein at least one of the first air flow regulating valve and the second air flow regulating valve is regulated such that the process air temperature between cooling and de-icing temperature ranges in the first pipeline and the second pipeline is switched in a time delayed manner consecutively without affecting the output temperature of the third pipeline.

2. The method of claim 1, wherein the mixed process air according to step e) is composed of the process air provided at the turbine outlet and a branched-off fresh air component of the temperature-reduced fresh air.

3. The method of claim 1, wherein the process air is temperature-controlled variably by an alternate feeding of valve-regulated pressure components of the temperature-reduced fresh air according to step d).

4. The method of claim 3, wherein a transport of a particular fresh air component, which is fed to the fifth and the sixth pipeline, is controlled using an air flow regulating valve, that are integrated in each of the fifth pipeline and the sixth pipeline.

5. The method of claim 4, wherein the transport of the particular fresh air component through the fifth pipeline or the sixth pipeline occurs with a time delay and is realized using a time-delay element integrated in a respective air flow regulating valve.

6. The method of claim 5, wherein a second fresh air component which flows through the sixth pipeline is transported with a second time delay in comparison to a first fresh air component, which flows through the fifth pipeline and is viewed as a reference fresh air component.

7. The method of claim 1, wherein the first and the second turbine initially provide the process air at the turbine outlet, that has a process air temperature operates in a first-time range A-B in a part-load range from approximately 0° C. to approximately −8° C., and in the same way, during an operating time of the air conditioner, the temperature-reduced fresh air is provided at the outlet of the first hot air source according to step a), whose fresh air temperature operates in a load range from approximately 30° C. to approximately 100° C., and g) increasing the process air temperature of a first turbine to at least approximately 30° C. to approximately 45° C. by a valve-regulated supply of the fresh air component of the temperature-reduced fresh air according to step d), by which all process air lines connected downstream from the turbine and valve integrated in the process air lines are de-iced, and simultaneously moving the process air temperature of the second turbine to cooling capacity, by which further ice accumulations with the process airlines are prevented, these process air temperatures of the first turbine and the second turbine being kept at a constant temperature value within a second time range B-C, and h) bringing the process air temperature of the first turbine and the second turbine to a normal process air temperature by the valve-regulated supply of the fresh air component of the temperature-reduced fresh air according to step d), this process air temperature corresponding to that according to step f), this process air temperature of the first turbine and the second turbine being kept at a constant temperature value within a third time range C-D; and i) moving the process air temperature of the first turbine to maximum cooling capacity and substantially simultaneously increasing the process air temperature of the second turbine is increased to approximately 30° C. to approximately 45° C. by the valve-regulated supply of the fresh air component of the temperature-reduced fresh air according to step d), by which ice accumulations with the second pipeline connected downstream from the second turbine and pipelines connected to the second pipeline as well as valves integrated in the pipelines are prevented, this process air temperature of the first turbine and the second turbine being kept at a constant temperature value within a fourth time range D-E; and j) repeating step h) with a restriction that the process air temperature of the first turbine and the second turbine is kept at a constant temperature value step-by-step within a fifth time range E-A.

8. The method of claim 1, wherein according to step g), valve-regulated throttling of a particular fresh air component of the temperature-reduced fresh air is performed using a second air flow regulating valve, which is integrated in the sixth pipeline and operates with a time delay, in such a way that the process air temperature of the second turbine is reduced with a predefined time delay until the maximum cooling capacity is reached, if the process air temperature of the process air of a first turbine is increased using the fresh air component of the temperature-reduced fresh air passing the fifth pipeline, which is valve-regulated by a first air flow regulating valve integrated in the fifth pipeline.

9. The method of claim 1, wherein according to step i), a valve-regulated throttling of a particular fresh air component of the temperature-reduced fresh air is performed using a first air flow regulating valve, which is integrated in the fifth pipeline and operates with a time delay, in such a way that the process air temperature of a first turbine is reduced with a predefined time delay, until the maximum cooling capacity is reached, if the process air temperature of the process air of the second turbine is increased using the fresh air component of the temperature-reduced fresh air passing the sixth pipeline, which is valve-regulated by a second air flow regulating valve integrated in the sixth pipeline.

10. The method of claim 7, wherein step f) to step j) are primarily performed during a time the aircraft remains on a ground and are repeated arbitrarily in a specified sequence.

11. The method of claim 3, wherein a performance of step f) through j) is related to a time period which relates to an interval of a takeoff and a landing phase of the aircraft or during a flight and very low altitudes below approximately 15,000 feet.

* * * * *